United States Patent [19]

Ljung

[11] 4,406,965
[45] Sep. 27, 1983

[54] DITHER PICK-OFF TRANSDUCER FOR RING LASER GYROSCOPE

[75] Inventor: Bo H. G. Ljung, Wayne, N.J.

[73] Assignee: The Singer Company, Little Falls, N.J.

[21] Appl. No.: 262,732

[22] Filed: May 12, 1981

[51] Int. Cl.³ .................. H01L 41/08; G01B 9/02
[52] U.S. Cl. .................. 310/319; 310/330; 356/350
[58] Field of Search .................. 310/330–332, 310/314–319, 321, 366, 346; 356/350; 330/272, 273; 331/94.5 ML, 94.5 C, 94.5 D, 65, 70, 158

[56] References Cited

U.S. PATENT DOCUMENTS

| | | | |
|---|---|---|---|
| 2,558,563 | 6/1951 | Janssen | 310/331 X |
| 3,043,921 | 7/1962 | Hester | 310/331 X |
| 3,153,229 | 10/1964 | Roberts | 310/366 X |
| 3,421,109 | 1/1969 | Wiggins et al. | 310/366 X |
| 4,099,876 | 7/1978 | Dorsman | 310/317 X |
| 4,113,387 | 9/1978 | Shutt | 310/332 X |
| 4,309,107 | 1/1982 | McNair et al. | 356/350 X |
| 4,314,174 | 2/1982 | Wing et al. | 310/321 X |
| 4,321,557 | 3/1982 | McNair | 356/350 X |

*Primary Examiner*—Mark O. Budd
*Attorney, Agent, or Firm*—Morris Liss; Thomas W. Kennedy

[57] ABSTRACT

A piezoelectric pick-off transducer is used for sensing dither velocity in a ring laser gyroscope. The pick-off transducer is mounted on a spoke connecting the hub and rim of the gyroscope and it comprises two spaced electrodes equidistant about the point of inflection of the spoke. A differential amplifier is connected at its input to the electrodes for generating a signal proportional to dither velocity.

8 Claims, 6 Drawing Figures

DITHER PICK-OFF TRANSDUCER FOR RING LASER GYROSCOPE

FIELD OF THE INVENTION

The present invention relates to ring laser gyroscopes and more particularly to a dither velocity transducer mounted to such a gyroscope.

BRIEF DESCRIPTION OF THE PRIOR ART

Prior art ring laser gyroscopes (RLG) include a fixed hub connected to an outer movable rim by spokes. In order to increase the accuracy of the gyro by eliminating the well-known gyro lock-in effect, a dither motor is connected to the spokes which imparts a vibrational motion to the RLG. In order to drive the RLG with a predetermined dither, a piezoelectric transducer is attached to one of the spokes. One output from the piezoelectric transducer is fed to a first input of an operational amplifier while the second input of the operational amplifier is connected to ground. The piezoelectric transducer is also connected to ground via the spoke and the hub. The dither signal is obtained at the output of the operational amplifier. The ground connections between the hub and the operational amplifier input pose problems in an operative RLG. The reason for this is that, usually, this ground also carries current to power the dither motor. This current causes a voltage drop in the ground wire which is picked up by the operational amplifier and enters the servo-loop between the piezoelectric pick-off transducer and the dither motor. This results in an unpredictable feedback.

Another problem encountered in the prior art is the structure of the transducer itself. It is desirable to have high conductivity connections so that a good ground connection between the transducer and the inner hub is achieved. However, adhesives that have high conductivity are of low mechanical strength.

During extended operation of prior art RLGs, the transducers become partly detached and this affects the amplitude of the signal generated.

BRIEF DESCRIPTION OF THE PRESENT INVENTION

The present invention utilizes a novel piezoelectric transducer having two electrodes. Both electrodes are equidistant from the point of inflection of a spoke to which the transducer is mounted. Therefore, during deformation of the spoke, push-pull outputs are derived so that the transducer is sensitive only to rotational velocity inputs of the gyro.

The connection of a differential amplifier circuit to the outputs of the transducer renders ground currents, from sources such as the dither motor, of no consequence.

As will be appreciated from a review of the detailed description to follow, the present invention permits the utilization of a single point ground and reduced input capacitance enhances the signal-to-noise ratio from the transducer differential amplifier circuitry.

The attachment of the transducer with an insulating structural epoxy material results in superior mounting strength of the transducer to a corresponding spoke of an RLG.

The above-mentioned objects and advantages of the present invention will be more clearly understood when considered in conjunction with the accompanying drawings, in which:

DETAILED DESCRIPTION OF THE INVENTION

Figure 1:
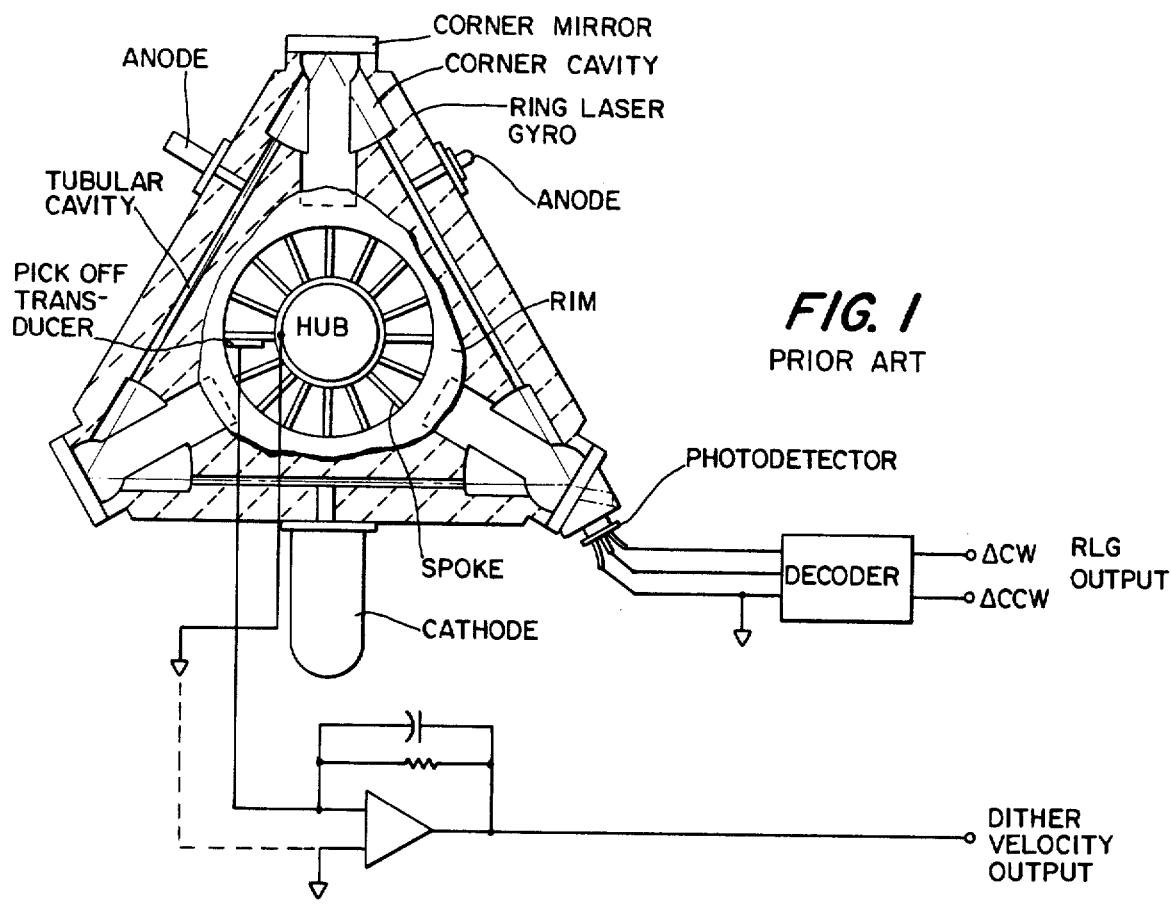
FIG. 1 is a sectional view of a prior art ring laser gyro (RLG) illustrating the mounting of a pick-off transducer.

FIG. 1 illustrates a prior art ring laser gyro (RLG) including a triangular body with a tubular cavity enclosed therein. Corner cavities interconnect the tubular cavity segments so that a continuous path is created for lasing. Gas is caused to be ionized by the illustrated cathode and anodes. This gas plasma provides the necessary gain for lasing. A photodetector is located at one corner of the RLG structure, the output of which provides the input to beam combiner. The output from the combiner forms the outputs of the RLG.

It has been long established that, to increase the accuracy of the output by avoiding the well-known lock-in effect, a dither should be impressed upon the RLG. This is customarily done by dithering the RLG with the help of a torsional spring about the central hub, which is connected to the rim of the spring by radially extending spokes. In order to measure the dither velocity so that it may be regulated, a piezoelectric transducer, such as the type previously discussed in connection with the Brief Description of the Prior Art, is suitably attached to a spoke. Thus far, the prior art structure is of the type disclosed in U.S. patent application Ser. No. 168,918, filed July 14, 1980, and assigned to the assignee of the present invention.

With continued reference to FIG. 1, an operational amplifier has one input connected to the piezoelectric transducer while a second input of the operational amplifier is connected to ground and thus to the pick-off transducer via the conductive hub and spoke to which the transducer is mounted.

Figure 2:
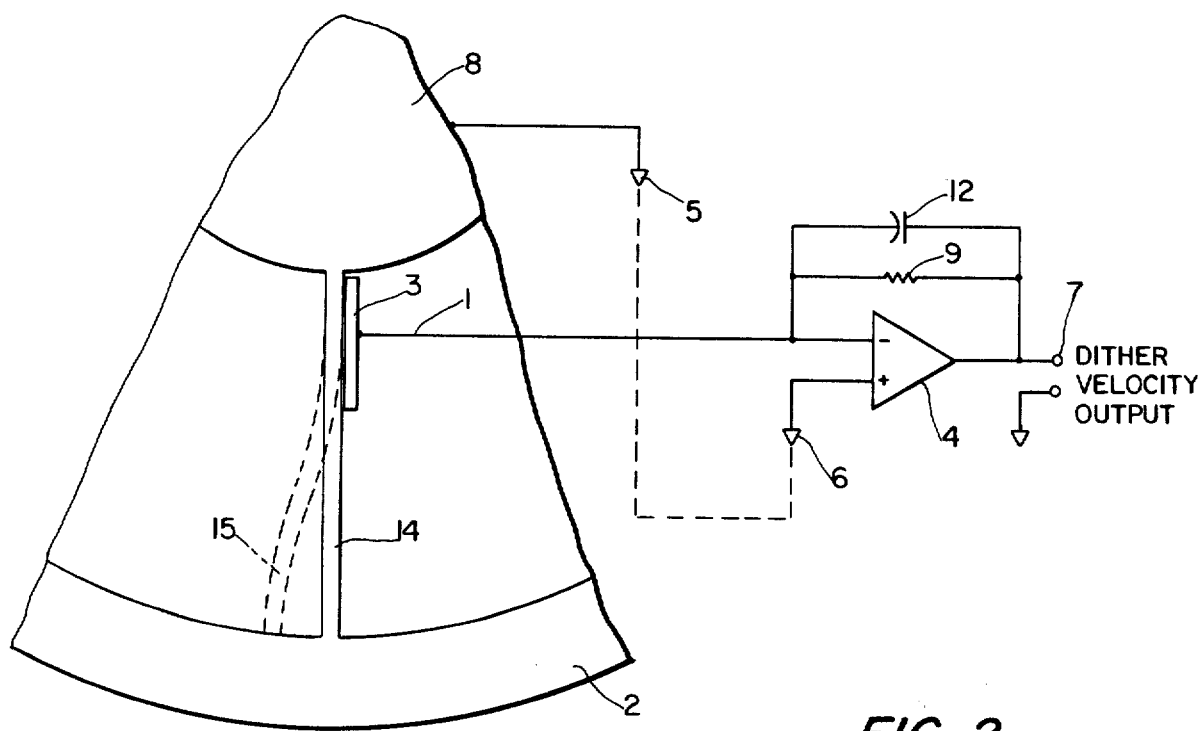
FIG. 2 is a partial schematic view of the prior art piezoelectric pick-off transducer as mounted to a spoke and electrically connected to an operational amplifier.
Figure 3:
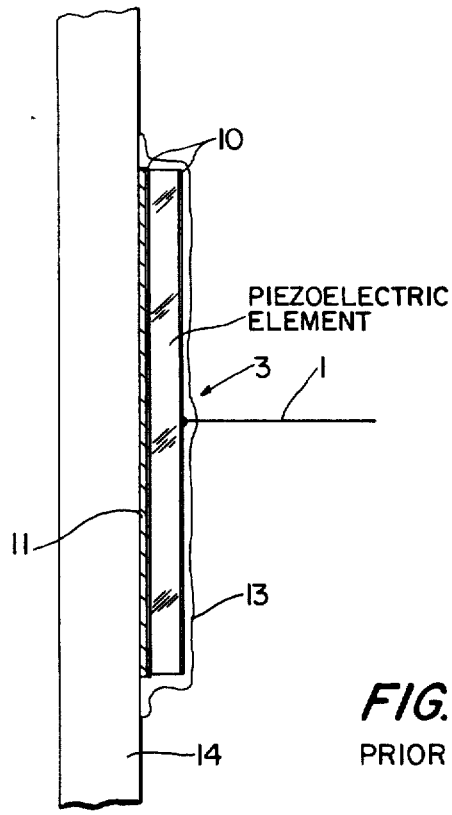
FIG. 3 is a detailed sectional view of the mounted pick-off transducer shown in FIG. 2.

The detail concerning the transducer and its associated circuitry is shown in the prior art drawings of FIGS. 2 and 3 which illustrate the mounting and associated circuitry of prior art transducers for RLGs.

The piezoelectric transducer 3 is attached to one of the spokes 14 in a manner described below. The fixed hub 8 is fixed to one end of the spokes, while the opposite spoke ends are connected to rim 2 so that the latter can vibrate rotationally at a small angle, typically 100 arcseconds at approximately 400 Hz. As previously mentioned, this dither rotation is superimposed upon the motion of the RLG in order to avoid the effects of gyro lock-in.

A single spoke is shown in an enlarged deformed position generally indicated by reference numeral 15.

During the dither motion of the RLG, the transducer 3 generates a current proportional to velocity. This current flows through lead 1 to operational amplifier 4. The current also returns to transducer 3 via ground connection points 6 and 5 (shown by the dashed line) and then to hub 8 where current continues to flow through the spoke 14 for return to the transducer 3.

The transducer is shown in greater detail in FIG. 3 wherein the right and left surfaces of the transducer are covered with silver electrodes, which are typically fired on the transducer. The right electrode 10 is covered by a conformal coating 13, while the left silver electrode 10 is attached to spoke 14 with a conductive silver or gold epoxy layer 11. The operational amplifier 4 is connected as a current-to-voltage converter. This is accomplished with resistor 9. Capacitor 12 is relatively small, in the order of a couple of picofarads, and is added only to stabilize the operational amplifier 4 at high operating frequencies. The circuitry described is a conventional current-to-voltage converter well known to those skilled in the art.

The ground connection from point 5 to point 6, shown in FIG. 2 by a dashed line, causes problems in a working RLG. The reason for this is that usually this ground also carries current to power the dither motor (not shown). Any current in the ground line causes a voltage drop that results in an unwanted output signal at terminal 7. This output signal will enter a servo-loop between the motor and the transducer causing an unpredictable feedback.

Further reviewing FIG. 3, a source of problems is the means of attaching the transducer 3 to the spoke 14. In the illustrated prior art design, attachment is accomplished by conductive silver bearing epoxy layer 11. More particularly, the problem is that high conductivity and high strength are mutually exclusive with such a material. However, both attributes are required and the result in many cases is that compromised strength causes the transducer to fall off during operation of the RLG.

Further, with the placement of the transducer along one end portion of the spoke as illustrated, the mechanical stress in the transducer is high. This may cause some loss in the sensitivity of the transducer after extended use.

Figure 4:
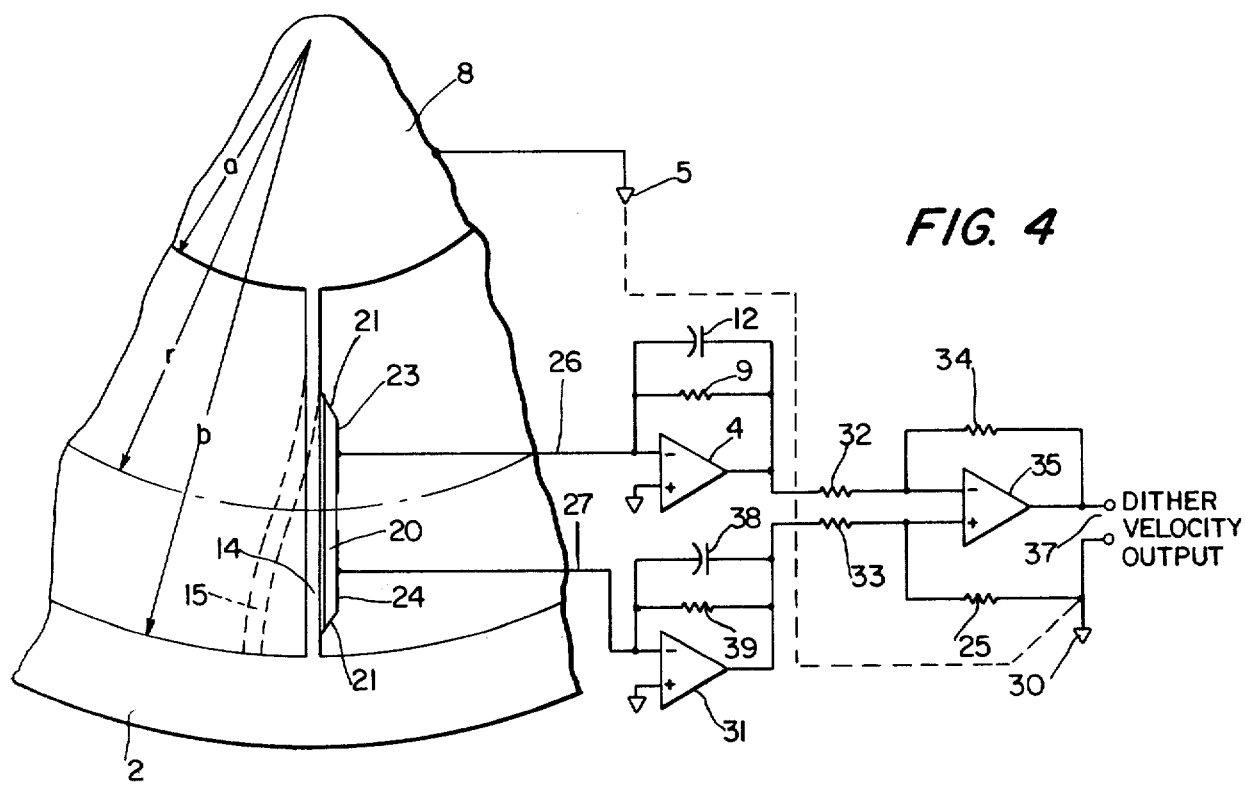
FIG. 4 is a partial schematic view of the present piezoelectric pick-off transducer and associated circuitry.

FIG. 4 illustrates the first embodiment of the present invention which is an improvement over the prior art configuration. As will be noted in FIG. 5, a piezoelectric transducer 20 is attached to spoke 14 such that the center point of transducer 20 is at the indicated radius "r". Radius "r" is only a function of hub radius "a" and rim radius "b". Radius "r" is defined as the radius where the spoke has a zero bending moment due to a rotation of rim 2. Otherwise stated, radius "r" is located at the inflection point of spoke 14. The transducer 20 is, as before, polarized in the thickness mode.

Figure 5:
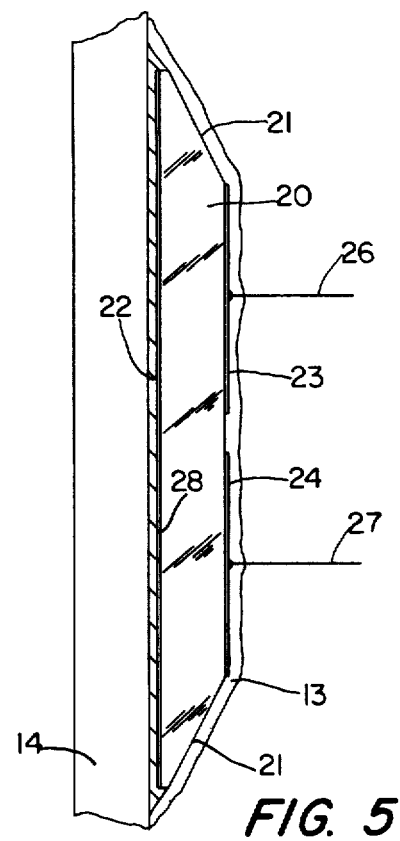
FIG. 5 is a sectional view of the present piezoelectric pick-off transducer structure as mounted to a spoke.

Referring to FIG. 5, the transducer is characterized by tapered ends 21 and the attachment of the transducer 20 to the spoke 14 is accomplished by means of an epoxy layer 22 having an insulating carrier. Typically, one may use a B-stage film epoxy with a 0.002 inch thick fiberglass weave carrier. The right illustrated electrode comprises partitioned electrodes 23 and 24 and is typically made from silver and is divided by prior etching into the two illustrated electrode areas. They are respectively electrically connected to amplifiers 4 and 31 through leads 26 and 27. When the spoke is subjected to a deformation, such as illustrated by reference numeral 15 in FIG. 4, the piezoelectric material underneath electrode 23 is stretched while the material underneath electrode 24 is compressed. This gives rise to current flow along a path including wire 26, electrode 23, crystal material of transducer 20 (in the form of displacement current), the left silver electrode 28, back through the crystal material of the transducer, the electrode 24, and finally out through wire 27.

Amplifiers 4 and 31 each operate as the discussed prior art current converter. Capacitor 38 and resistor 39 of amplifier 31 correspond to capacitor 12 and resistor 9 of amplifier 4. Leads 26 and 27 serve as respective inputs to amplifiers 4 and 31. This implies, considering the transducer push-pull operation, that the left silver electrode 28 is also at ground potential. Thus, nominally, there is no voltage across the gap created by epoxy layer 22 which is an insulating film with a carrier. This construction has the advantage that leakage resistance across layer 22 is of no significance. Further, because leads 26 and 27 are virtual grounds, they can be shielded. The shield capacitance will not add phase error to the output signal at terminals 37. Amplifier 35 is connected as a true differential amplifier. Input resistors 32 and 33 are of equal resistance, as are feedback resistors 34 and 25. Thus, the transducer-amplifier combination responds only to differential inputs such as caused by rotation of the output movable rim 2 of the RLG. Stretching of the spoke to which the transducer 20 is mounted results in a common input to the amplifiers 4 and 31. Thus, no output at terminals 37 will result. Also, no output at terminals 37 results from a ground current passing between ground points 5 and 30 because of the high common mode rejection of the circuit.

Ground point 30 can be chosen as a single point ground for the system. In such a situation, ground point 5 is without significance and therefore has no function. It is quite important in a complex electronic system, such as an RLG, to be able to utilize a single point ground system. This is usually not possible with prior art systems.

Figure 6:
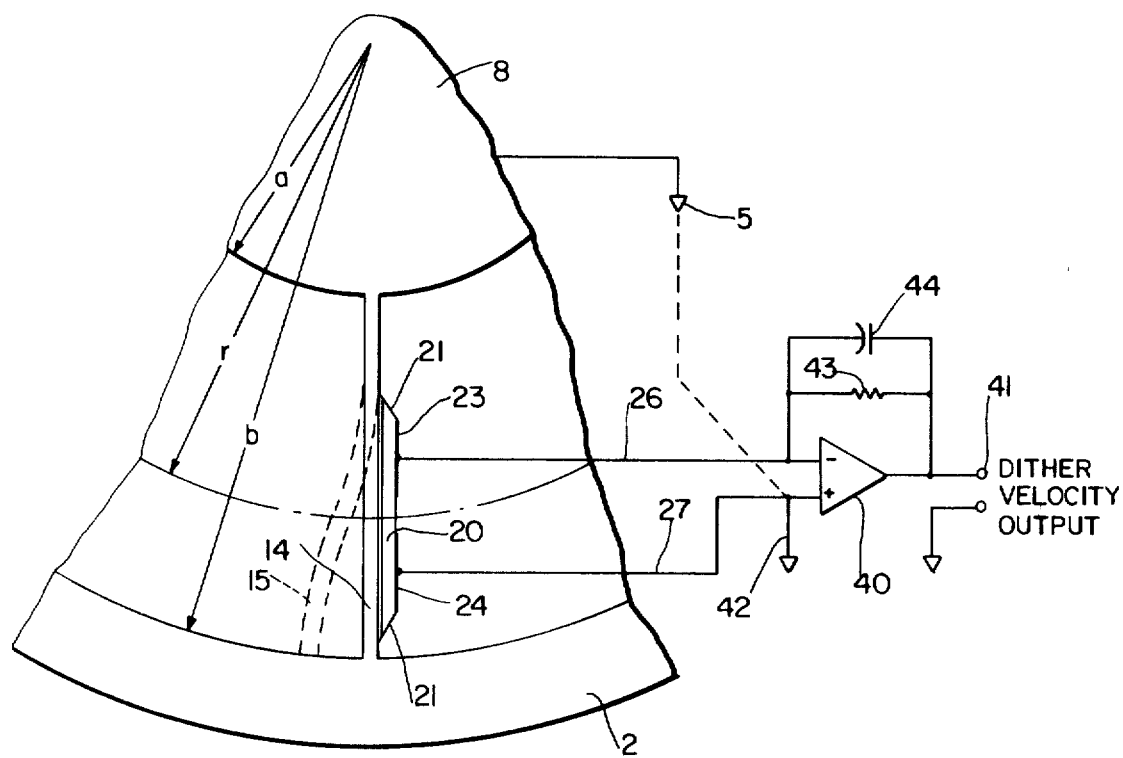
FIG. 6 is a second embodiment of the present invention illustrating a simplified differential amplifier connected to the inventive transducer.

FIG. 6 illustrates an alternate embodiment of the present invention utilizing only a single amplifier 40. The transducer 20 and its physical placement along spoke 14 are identical to the previously explained embodiment of FIG. 4. Further, the structure of the transducer 20 itself is identical to that of FIG. 5.

The primary difference is that the lead 27 is returned to ground point 42 of the single amplifier 40 instead of providing an input to the second amplifier 31, such as shown in FIG. 4. In the configuration of FIG. 6, there is no rejection for common mode current disturbances in the ground path from points 5 to 42. Thus, this circuit is particularly appropriate for use where ground currents are of little concern.

Also, because the capacitance in the epoxy layer 22 is approximately 1/50 the capacitance between the electrodes 23, 24 and 28, a small error voltage in the ground connection between points 5 and 42 causes an output voltage at the dither output terminals 41 which is only approximately 1/50 the error of prior art pick-off transducers.

Accordingly, the embodiments of the present invention feature a balanced piezoelectric transducer with a push-pull output sensitive only to rotational velocity inputs. In a case where ground currents from a dither motor are generated, the first disclosed embodiment of FIG. 4 will eliminate such ground current. The invention permits the utilization of a single point ground and reduced input capacitance which increases the signal-to-noise ratio obtained from the transducer. Further, attachment of the transducer with insulating structural epoxy instead of the prior art conductive epoxy renders greater adhesion properties between the two. The use of tapered ends on the transducer reduces the stress in the epoxy at a point where the transducers are especially vulnerable to peeling failure.

It should be understood that the invention is not limited to the exact details of construction shown and described herein for obvious modifications will occur to persons skilled in the art.

I claim:

1. A piezoelectric dither pick-off transducer system for use with a ring laser gyroscope having radial spokes connecting a hub and a rim, the system comprising:
   a piezoelectric transducer having at least two output leads for push-pull operation and mounted to a spoke at the inflection point thereof;
   differential means connected at its inputs to the leads for measuring the difference between dither signals at the inputs; and
   terminals connected to the output of the differential means for measuring a generated dither signal.

2. The system set forth in claim 1 wherein the transducer comprises:
   an adhesive insulating film for attachment to the spoke;
   an electrode deposited on a first piezoelectric transducer surface adjacent the spoke; and
   two coplanar separated electrodes deposited on a second transducer surface, opposite the first surface, the two leads respectively connected to the two separated electrodes.

3. The system set forth in claim 1 wherein the differential means comprises an operational amplifier having first and second inputs and an output, and means connected between the inputs and output for establishing operation of the operational amplifier as a current-to-voltage converter.

4. The system set forth in claim 1 wherein the differential means comprises first and second operational amplifiers, each having a first input connected to a respective lead and a second grounded input, each operational amplifier operating as a current-to-voltage converter, and a differential amplifier connected at both inputs thereof to respective outputs of the operational amplifiers.

5. The system set forth in claim 3 together with:
   means for grounding the hub;
   means connecting the first and second inputs of the operational amplifier to respective transducer leads; and
   means connecting the second input of the operational amplifier to ground.

6. The system set forth in claim 4 together with means connecting the hub to ground.

7. The system set forth in claim 2 wherein the differential means comprises an operational amplifier having first and second inputs and an output, and means connected between the inputs and output for establishing operation of the operational amplifier as a current-to-voltage converter.

8. The system set forth in claim 2 wherein the differential means comprises first and second operational amplifiers, each having a first input connected to a respective lead, and a second grounded input, each operational amplifier operating as a current-to-voltage converter, and a differential amplifier connected at both inputs thereof to respective outputs of the operational amplifiers.

* * * * *